United States Patent

Moser et al.

[11] Patent Number: 6,053,153
[45] Date of Patent: Apr. 25, 2000

[54] INTERNAL COMBUSTION ENGINE

[75] Inventors: Winfried Moser, Ludwigsburg; Klaus Joos, Walheim; Anwar Abidin, Leonberg; Georg Mallebrein, Korntal-Muenchingen; Jorg Lange, Eberdingen; Andreas Eichendorf, Schorndorf; Christof Vogel, Bischberg; Gerhard Benz, Boblingen; Nikolaus Simon, Murnau, all of Germany

[73] Assignee: Robert Bosch GmbH, Stuttgart, Germany

[21] Appl. No.: 09/101,326
[22] PCT Filed: Sep. 30, 1997
[86] PCT No.: PCT/DE97/02244
§ 371 Date: Nov. 6, 1998
§ 102(e) Date: Nov. 6, 1998
[87] PCT Pub. No.: WO98/20246
PCT Pub. Date: May 14, 1998

[30] Foreign Application Priority Data

Nov. 7, 1996 [DE] Germany .............. 196 45 819

[51] Int. Cl.$^7$ .......... F02M 31/18; F02M 29/00; F02M 53/02
[52] U.S. Cl. .......... 123/557; 123/549
[58] Field of Search .............. 123/557, 549, 123/590

[56] References Cited

U.S. PATENT DOCUMENTS

| | | |
|---|---|---|
| 2,322,991 | 6/1943 | Wunsch et al. .......... 123/557 |
| 3,618,579 | 11/1971 | Varran .......... 123/557 |
| 4,329,964 | 5/1982 | Morris .......... 123/557 |
| 5,343,848 | 9/1994 | Birch et al. .......... 123/557 |
| 5,408,973 | 4/1995 | Spangjer .......... 123/557 |
| 5,711,282 | 1/1998 | Lang et al. .......... 123/557 |

*Primary Examiner*—Marguerite McMahon
*Attorney, Agent, or Firm*—Ronald E. Greigg; Edwin E. Greigg

[57] ABSTRACT

An internal combustion engine for motor vehicles, with an intake tube for aspirating combustion air, in which the tube leads to at least one combustion cylinder, and in which tube a throttle valve is disposed. The intake tube effects a mixing of combustion air and fuel vapor downstream of the throttle valve. For the sake of intensive mixing of fuel vapor and combustion air into a largely homogeneous mixture, the fuel vapor generated in a fuel evaporator outside the intake tube is introduced via a delivery device into air turbulence paths that unavoidably develop downstream of the throttle valve in the intake tube as a consequence of the geometry of the intake tube and/or throttle valve.

19 Claims, 4 Drawing Sheets

INTERNAL COMBUSTION ENGINE

PRIOR ART

The invention relates to an internal combustion engine.

In such an engine, to reduce the hydrocarbons contained in the exhaust gas (raw HC emissions), the combustion cylinders of the cold engine upon cold starting and during the then ensuing warmup are supplied centrally, via the intake tube, with fuel vapor mixed with combustion air. As a result, combustion in the combustion cylinders proceeds in a highly stable and largely homogeneous way, and HC emissions are reduced drastically. In normal driving, conversely, the fuel vapor admixture is dispensed with, and the fuel is delivered to the combustion cylinders in the known way via the injection valves.

In one known method for mixing fuel vapor with combustion air in the central intake tube of the internal combustion engine (Charles Aquino and Williams D. Plensdorf, "An Evaluation of Local Heating as a Means of Fuel Evaporation for Gasoline Engines", International Congress and Exposition, Detroit, Michigan, Feb. 24–28, 1985, SAE Technical Paper Series, 860 246, 1986), so-called swirl vanes disposed downstream of the throttle valve create turbulence paths in the intake tube, into which paths fuel is injected largely tangentially into the intake tube by means of two injection valves disposed upstream of the throttle valve. The fuel spray introduced is carried by the turbulence along heated surfaces downstream of the swirl vanes in the intake tube and is evaporated there. The resultant fuel vapor mixes intensively with the now-turbulent combustion air, thus creating a largely homogeneous fuel-air mixture. The swirl vanes built into the intake tube for creating turbulence are disadvantageous, however, in the sense that they markedly throttle the aspirated air and thus lead to a considerable loss in power and efficiency.

ADVANTAGES OF THE INVENTION

The internal combustion engine according to the invention, and the method of the invention employed in this engine, have the advantage over the prior art that for the intensive mixing of fuel vapor and combustion air, no built-in fixtures in the intake tube that reduce the power and efficiency are provided; instead, the turbulence paths that are naturally present in the intake tube and that unavoidably develop because of the intake tube and/or throttle valve geometry, which is already determined by other considerations, are utilized to make the fuel vapor generated outside the intake tube turbulent. Such turbulence paths develop at structurally dictated discontinuities of the intake tube wall and in particular at the edges of the throttle valve. Compared with the intake tube without fuel vapor admixture for cold starting and warmup, no additional flow resistances develop as a result of the fuel vapor admixture; compared with the known central fuel vapor admixture, along with this advantage of improving power and efficiency, the structural expense in the intake tube is reduced. Because the fuel vapor is generated outside the intake tube and introduced into the air eddies, instead of the introduction of fuel spray with ensuing evaporation along heated surfaces in the intake tube, a very homogeneous mixture formation is achieved even before the connections where the intake tube branches to lead to the individual combustion cylinders, and as a result an exactly identical quality of the fuel-air mixture for the individual combustion cylinders is assured. This in turn leads to identical operating conditions for all the combustion cylinders, to a reduction in wall film development in the combustion cylinders, and to stable combustion in the combustion cylinders. The expulsion of hydrocarbons with the exhaust gas is reduced drastically, and the catalytic converter can already begin converting very early after the engine has started.

Advantageous refinements of and improvements of the internal combustion engine disclosed are possible with the provisions recited herein.

Introducing the fuel vapor into the "natural" turbulence paths in the intake tube can be achieved by suitable geometrical definitions of the orifice of the fuel vapor delivery device inside the intake tube.

In a preferred embodiment of the invention, to that end, the delivery device has at least two discharge openings, disposed diametrically near the intake tube wall, whose opening cross section in each case points in the flow direction, inclined by an angle of approximately 450 from the intake tube axis. The two discharge openings are each embodied on the face end of one of two diametrically opposed orifice stubs, which protrude radially from the intake tube wall and are joined via a semicircular feed elbow, contacting the intake tube wall, to a feed stub that penetrates the intake tube wall and is connected to the fuel evaporator.

In an alternative embodiment of the invention, in a version with a so-called register throttle valve, the delivery device has a discharge opening, disposed in the region of the partitioning rib, whose opening cross section points in the flow direction, inclined by an angle of approximately 45° from the intake tube axis. This discharge opening is embodied on the face end of an orifice stub, which penetrates the intake tube wall and extends into the region of the partitioning rib and is connected to the fuel evaporator.

BRIEF DESCRIPTION OF THE DRAWINGS

The invention is described in further detail below in terms of exemplary embodiments shown in the drawings. Shown are.

DESCRIPTION OF THE EXEMPLARY EMBODIMENTS

Figure 1:
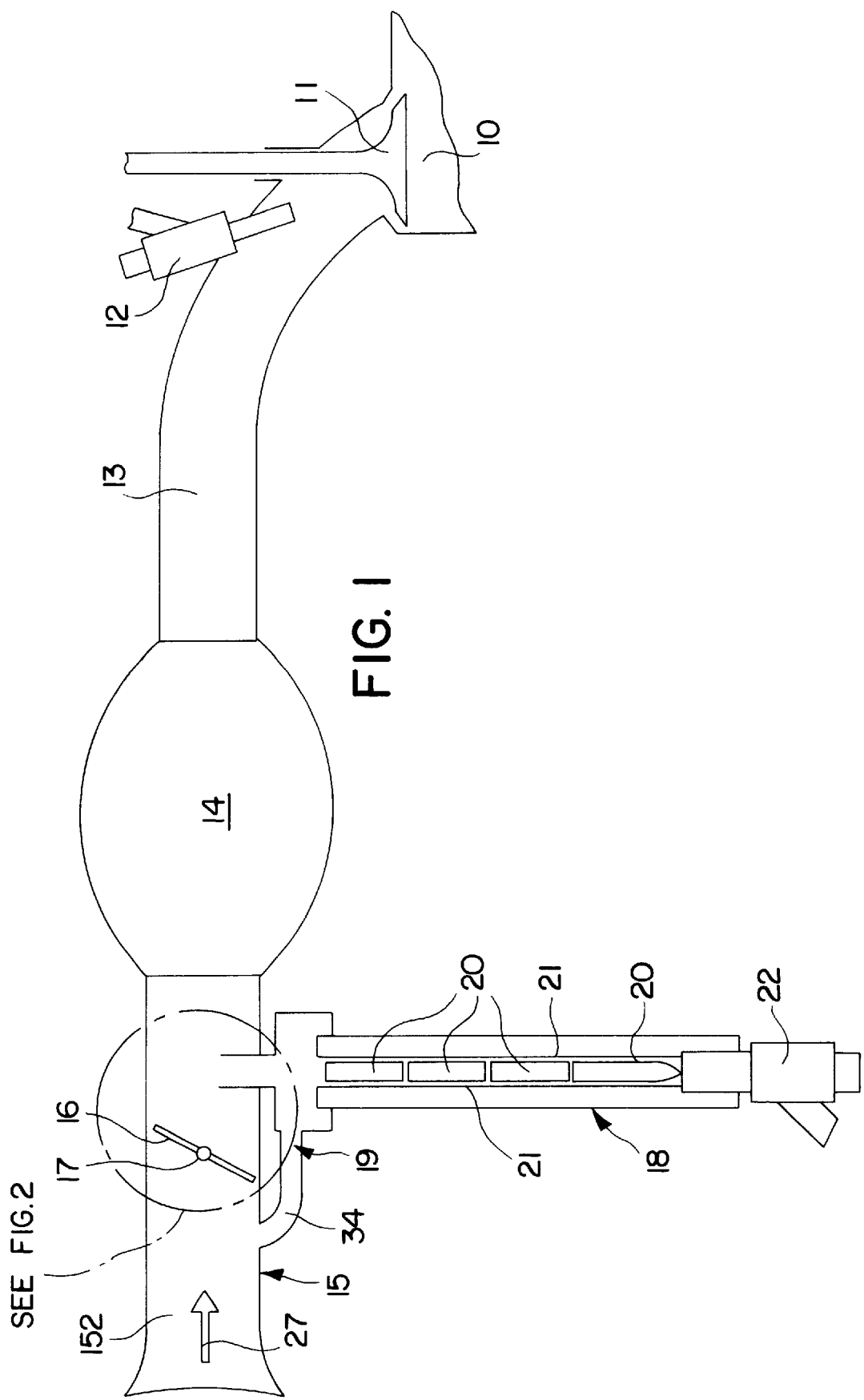
FIG. 1, a fragmentary schematic longitudinal section through an internal combustion engine with a combustion cylinder and an intake tube.

The internal combustion engine shown in fragmentary, schematic form in longitudinal section in FIG. 1 has a plurality of combustion cylinders, of which only one combustion cylinder 10 is shown in fragmentary form, with a schematically indicated inlet valve 11 and a fuel injection valve 12. Leading to the inlet valve 11 of the combustion cylinder 10 is a so-called swing pipe 13, which like the other swing pipes 13 for the other combustion cylinders 10 branches off from a calming chamber 14. An intake tube 15 of the engine opens into the calming chamber 14 and serves to aspirate combustion air that is then carried to the inlet valves 11 of the combustion cylinders 10 via the individual swing pipes 13. The quantity of aspirated combustion air needed is controlled by means of a throttle valve 16, which is pivotably supported in the intake tube 15 on a pivot shaft 17 oriented transversely to the flow direction and can be pivoted out of a closing position, which covers the air flow cross section of the intake tube 15, into an open position that opens the entire cross section of the intake tube, and vice versa, and can also assume any intermediate position between them.

To improve hydrocarbon-emissions in the exhaust gas on cold starting of the engine and ensuing warmup, in these operating phases of the engine the combustion air aspirated via the intake tube 15 has fuel vapor added to it, which is mixed intensively with the combustion air so that the most homogeneous possible fuel-air mixture is supplied to the combustion cylinders 10 via the inlet valves 11. To that end, a fuel evaporator 18 is provided, which communicates with the interior of the intake tube 15, via a delivery device 19. The fuel evaporator 18 has convective heating surfaces 20, between which narrow flow gaps 21 of small cross section are kept open, and also has an injection valve 22 for injecting fuel into these flow gaps. The fuel injected by the injection valve 22 between the heating surfaces 20 is forced through the flow gaps 21 and is evaporated in the process. The resultant fuel vapor is delivered via the delivery device 19 to the intake tube 15, in an intake tube portion 151 located immediately downstream of the throttle valve 16. The introduction of the fuel vapor is effected by a suitable disposition and embodiment of the orifice of the delivery device 19 in the intake tube portion 151 such that the fuel vapor enters a turbulence path of the combustion air that develops unavoidably in the intake tube portion 151 because of the structurally dictated geometry of the intake tube and/or throttle valve. Such turbulence paths unavoidably form at discontinuities in the wall surface of the intake tube 15, for instance, but in particular at the edges of the throttle valve 16.

Figure 2:
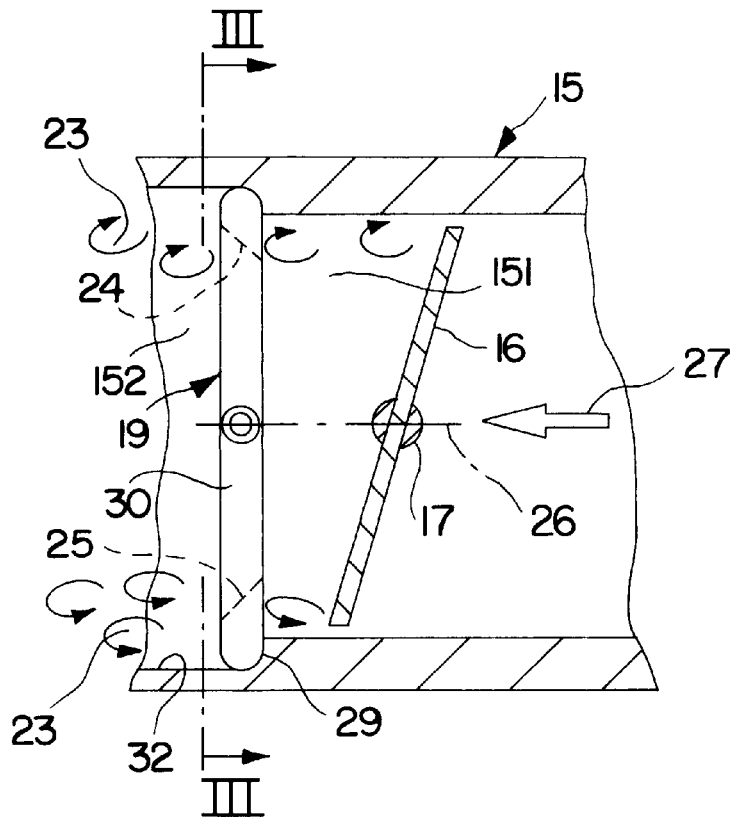
FIG. 2, an enlarged view of detail II in FIG. 1 in a constructional version.
Figure 3:
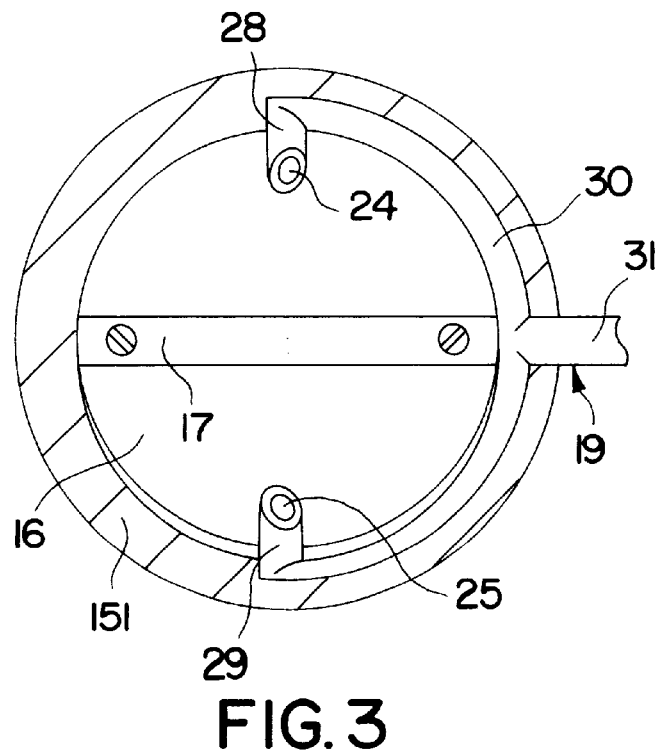
FIG. 3, a section taken along the line III—III of FIG. 2.

In the intake tube portion 151 shown in FIGS. 2 and 3, the fuel vapor is introduced into the turbulence path that unavoidably develops along the edge of the throttle valve. This turbulence path is represented in FIG. 2 by small flow arrows and identified in general by reference numeral 23. This turbulence path 23 develops over the entire circumference of what in this case is a circular throttle valve 16. To introduce the fuel vapor generated by the fuel evaporator 18 into this turbulence path 23, the delivery device 19 has two discharge openings 24, 25, located near the wall of the intake tube, and their opening cross section is in each case inclined at an angle of approximately 45° to the axis 26 of the intake tube 15 and points in the flow direction of the combustion air. The flow direction of the combustion air is indicated in FIGS. 1 and 2 by a flow arrow 27. Each of the discharge openings 24, 25 is embodied on the face end of a respective orifice stub 28 and 29 that protrudes radially from the wall of the intake tube. The two orifice stubs 28, 29 are located diametrically opposite one another along the intake tube axis 26 and are connected to a feed stub 31 via a semicircular feed elbow 30 extending between the two orifice stubs 28, 29. The feed stub 31 that opens into the feed elbow 30 passes radially through the wall of the intake tube 15 and communicates with the outlet of the fuel evaporator 18. The feed elbow 30 is placed in a semicircular recess 32 in the intake tube wall and is braced on the annular shoulder 33 formed on the end of the recess 32.

It is understood that still other discharge openings may be provided in the delivery device 19 of FIGS. 2 and 3; they will be embodied in the same way as the discharge openings 24, 25 but are offset by certain circumferential angles from them. These additional discharge openings are also formed on the free ends of orifice stubs, which communicate with the feed stub 31 via corresponding feed elbows. All of these discharge openings are disposed in such a way—as described for the discharge openings 24, 25—that the fuel vapor flowing out of them is introduced into the turbulence path 23 that develops at the circular circumference edge of the throttle valve 16.

In certain cases, air is also admixed with fuel vapor before it is introduced into the intake tube portion 151. To that end—as schematically sketched in FIG. 1—the delivery device 19 communicates via a conduit 34 with the intake tube portion 152 located immediately upstream of the throttle valve 16, so that a small portion of the combustion air is diverted from the intake tube 15, specifically in the intake tube portion 152, and is delivered via the delivery device 19, together with the fuel vapor, to the intake tube 15 again in the intake tube portion 151.

During normal driving modes, that is, after the conclusion of the engine warmup phase, the fuel vapor generation and admixture of fuel vapor is stopped, and fuel delivery to the combustion cylinders 10 is effected in the known way through the fuel injection valves 12.

Figure 4:
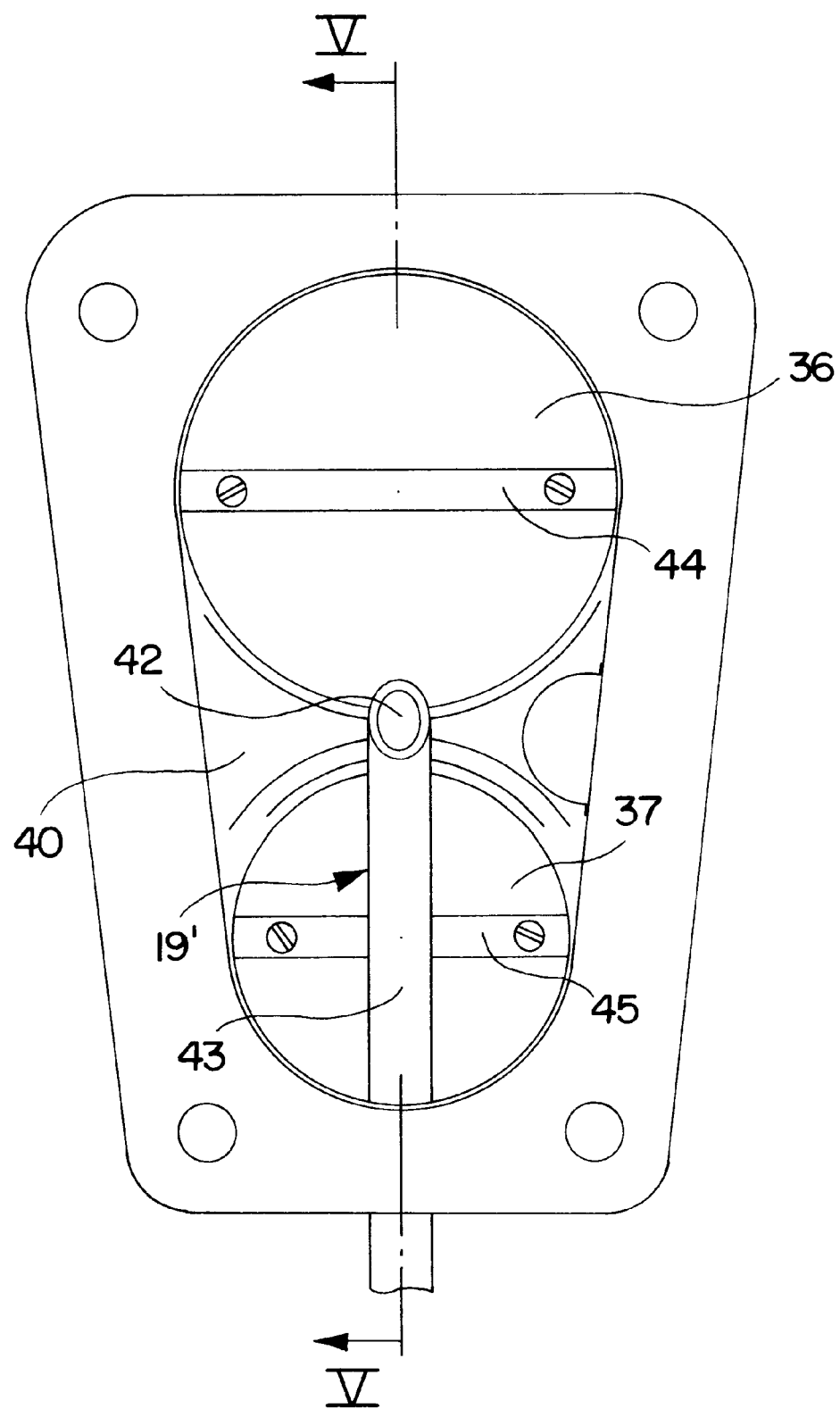
FIG. 4, a plan view on a modified intake tube of the internal combustion engine with a so-called register throttle valve.
Figure 5:
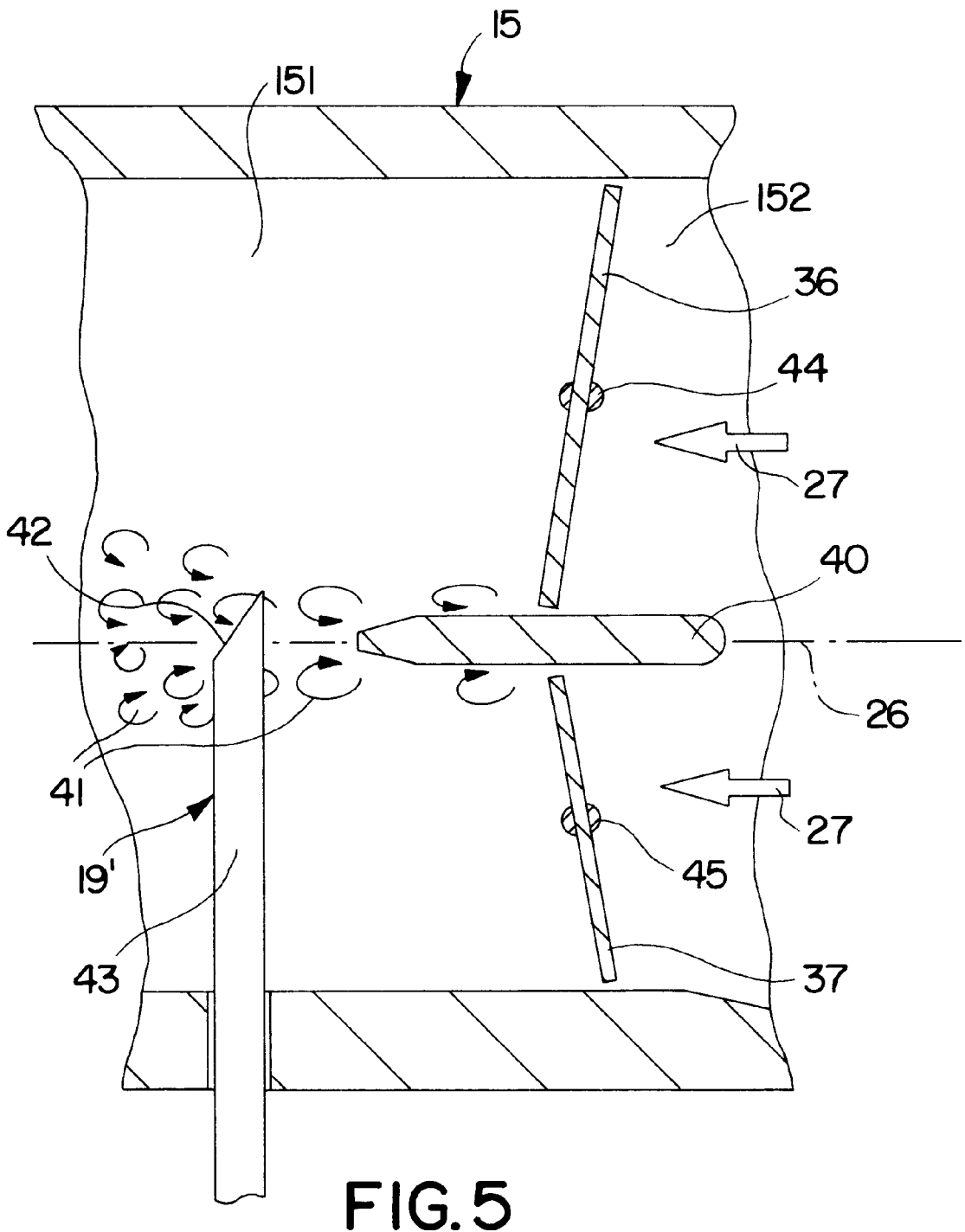
FIG. 5, a section taken along the line V—V of FIG. 4.

In the intake tube portion 151 of a modified intake tube 15, shown in FIGS. 4 and 5, the throttle valve is embodied as a so-called register throttle valve 35. The register throttle valve 35 includes two circular valve parts 36, 37 of different diameters, the upper valve part 37 having the larger diameter.

The two valve parts 36, 37 control two register openings, which are separated from one another by a partitioning rib 40 that extends as far as the wall of the intake tube. Each valve part 36, 37 is capable of closing the register opening, respectively, associated with it, either completely or partially or of opening it completely so that air can pass through.

In a register throttle valve 35 embodied in this way in the intake tube 15, the fuel vapor—optionally with the admixture of air—is introduced preferentially into the turbulence path 41 (FIG. 5) that unavoidably develops at the partitioning rib 40. To that end, the discharge opening 42 of the delivery device 19' is disposed in the region of the partitioning rib 40, and once again its opening cross section points in the flow direction (arrow 27 in FIG. 5) inclined at an angle of about 45° to the intake tube axis 26. The discharge opening 42 is formed on the face end of an orifice stub 43, which radially penetrates the intake tube wall and extends as far as the region of the partitioning rib 40 and is connected to the fuel evaporator 18 (FIG. 1).

The method for central admixing of fuel vapor with the combustion air aspirated via the intake tube 15 on cold starting of the internal combustion engine and in its warmup phase, which is realized in the internal combustion engine described above in two exemplary embodiments, is thus distinguished in summary form in that the fuel vapor is generated outside the intake tube 15 and is introduced into air turbulence paths 23 and 41 that unavoidably develop downstream of the throttle valve 16 or 35 in the intake tube 15 as a consequence of the geometry of the intake tube and/or the throttle valve. It is a decisive advantage that no additional provisions for making the air turbulent in the intake tube 15 and that present increased flow resistance to the aspirated air stream and by throttling this aspirated air stream reduce the power and efficiency are taken but instead that recourse is made to "naturally" occurring turbulence paths 23 and 41, into which the fuel vapor, generated outside the intake tube 15, is introduced directly. These "natural" air eddies are maximally well suited for intensive mixing of fuel vapor and aspirated air and thereby of delivering a homogeneous fuel-air mixture to the combustion cylinders 10 via the inlet valves 11, the quality of the fuel-air mixture being the same for all the combustion cylinders 10. The combustion thus proceeds very stably and extraordinarily homogeneously in all the combustion cylinders 10. As a result, the raw HC emissions of the cold engine can be drastically reduced, and at the same time engine operating conditions can be achieved that allow the catalytic converter to begin conversion quite soon after the engine starts.

The foregoing relates to preferred exemplary embodiments of the invention, it being understood that other variants and embodiments thereof are possible within the spirit and scope of the invention, the latter being defined by the appended claims.

What is claimed is:

1. An internal combustion engine for motor vehicle, comprising an intake tube (15) for aspirating combustion air, said intake tube leads to at least one combustion cylinder (10), at least one throttle valve (16; 35) is disposed in said tube, said intake tube brings about a mixing of combustion air and fuel vapor downstream of the at least one throttle valve (16; 35), for fuel evaporation, a fuel evaporator (18) is disposed outside the intake tube (15), the fuel vapor is introduced via a delivery device (19; 19') into an intake tube portion (151) located immediately downstream of the throttle valve (16; 35); and that an orifice of the delivery device (19; 19') is disposed in the intake tube (15) such that the fuel vapor enters a turbulence path (23; 41) of the combustion air that unavoidably develops in said intake tube portion (151) because of the structurally dictated geometry of the intake tube and/or throttle valve, and the delivery device (19) has at least two discharge openings (24, 25), disposed diametrically near a wall of the intake tube, an opening cross section of said at least two discharge openings point in the flow direction (27), inclined by an angle of approximately 45° from the intake tube axis (26).

2. The engine according to claim 1, in which the discharge openings (24, 25) are each embodied on the face end of one of two diametrically opposed orifice stubs (24, 25), which protrude from the intake tube wall and are joined via a semicircular feed elbow (30), contacting the intake tube wall, to a feed stub (31) that penetrates the intake tube wall and is connected to the fuel evaporator (18).

3. The engine according to claim 2, in which a semicircular recess (32) is made in the intake tube wall, and the feed elbow (30) rests in said semicircular recess (32) and is braced axially against a radial shoulder (33) formed there.

4. The engine according to claim 2, in which the feed elbow (30) and the orifice stubs (28, 29) are embodied integrally with one another.

5. The engine according to claim 3, in which the feed elbow (30) and the orifice stubs (28, 29) are embodied integrally with one another.

6. The engine according to claim 1, in which the fuel evaporator (18) has convective heating surfaces (20), with flow gaps (21) of smaller cross section located between them, and also has an injection valve (22) for injecting fuel into the flow gaps (21).

7. The engine according to claim 2, in which the fuel evaporator (18) has convective heating surfaces (20), with flow gaps (21) of smaller cross section located between them, and also has an injection valve (22) for injecting fuel into the flow gaps (21).

8. The engine according to claim 3, in which the fuel evaporator (18) has convective heating surfaces (20), with flow gaps (21) of smaller cross section located between them, and also has an injection valve (22) for injecting fuel into the flow gaps (21).

9. The engine according to claim 4, in which the fuel evaporator (18) has convective heating surfaces (20), with flow gaps (21) of smaller cross section located between them, and also has an injection valve (22) for injecting fuel into the flow gaps (21).

10. The engine according to claim 2, in which the intake tube (15) is followed by a calming chamber (14), and that from the calming chamber (14), swing pipes (13) each lead to one of a plurality of combustion cylinders (10).

11. The engine according to claim 3, in which the intake tube (15) is followed by a calming chamber (14), and that from the calming chamber (14), swing pipes (13) each lead to one of a plurality of combustion cylinders (10).

12. A method for central mixing of combustion air and fuel vapor in an intake tube (15) which leads to at least one combustion cylinder (10) of an internal combustion engine and which has a throttle valve (16; 35), generating the fuel vapor outside an intake tube (15), introducing the fuel vapor downstream of the throttle valve (16; 35) in the intake tube (15) into air turbulence paths (23; 41) that unavoidably develop as a consequence of the intake tube and/or throttle valve geometry.

13. The method according to claim 12, which comprises utilizing the air eddies that develop at the edges of the throttle valve as the air turbulence path (23) for introducing the fuel vapor.

14. The method according to claim 12, which comprises mixing air with the fuel vapor before the fuel vapor enters the intake tube (15).

15. An internal combustion engine for motor vehicles, comprising an intake tube (15) for aspirating combustion air, said intake tube leads to at least one combustion cylinder (10), at least one throttle valve (16; 35) is disposed in said tube, said intake tube brings about a mixing of combustion air and fuel vapor downstream of the at least one throttle valve (16; 35), for fuel evaporation, a fuel evaporator (18) is disposed outside the intake tube (15), the fuel vapor is introduced via a delivery device (19; 19') into an intake tube portion (151) located immediately downstream of the throttle valve (16; 35); and that an orifice of the delivery device (19; 19') is disposed in the intake tube (15) such that the fuel vapor enters a turbulence path (23; 41) of the combustion air that unavoidably develops in said intake tube portion (151) because of the structurally dictated geometry of the intake tube and/or throttle valve, and said fuel evaporator (18) has convective heating surfaces (20), with flow gaps (21) of smaller cross section located between them, and also has an injection valve (22) for injecting fuel into the flow gaps (21).

16. The engine according to claim 15, in which the throttle valve is embodied as a register throttle valve (35) with at least two valve parts (36, 37), disposed side by side or one above the other, each of which controls one of at least two register openings (38, 39) in the intake tube (15), these register openings being separated from one another by a partitioning rib (40) that extends as far as the intake tube wall, the delivery device (19') has a discharge opening (42), disposed in the region of the partitioning rib (40), whose opening cross section points in the flow direction (27), inclined by an angle of approximately 45° from the intake tube axis (26).

17. The engine according to claim 16, in which the discharge opening (42) is embodied on a face end of an orifice stub (43), which penetrates the intake tube wall and extends into a region of the partitioning rib and is connected to the fuel evaporator (18).

18. The engine according to claim 15, in which the intake tube (15) is followed by a calming chamber (14), and that from the calming chamber (14), swing pipes (13) each lead to one of a plurality of combustion cylinders (10).

19. The engine according to claim 15, in which the intake tube (15) is followed by a calming chamber (14), and that from the calming chamber (14), swing pipes (13) each lead to one of a plurality of combustion cylinders (10).

* * * * *